US012088008B2

(12) United States Patent
Puchades et al.

(10) Patent No.: US 12,088,008 B2
(45) Date of Patent: Sep. 10, 2024

(54) LASER CUT CARBON-BASED REFLECTOR AND ANTENNA SYSTEM

(71) Applicants: Rochester Institute of Technology, Rochester, NY (US); Eagle Technology, LLC, Wilmington, DE (US)

(72) Inventors: Ivan Puchades, Honeoye Falls, NY (US); Brian Landi, Rochester, NY (US); Ian D. Peterson, Rochester, NY (US); Rodney S. Sorrell, Melbourne, FL (US); Stephen R. Landers, Satellite Beach, FL (US); Andrew Bucossi, Rochester, NY (US)

(73) Assignees: Rochester Institute of Technology, Rochester, NY (US); Eagle Technology, LLC, Wilmington, DE (US)

( * ) Notice: Subject to any disclaimer, the term of this patent is extended or adjusted under 35 U.S.C. 154(b) by 0 days.

(21) Appl. No.: 17/179,182

(22) Filed: Feb. 18, 2021

(65) Prior Publication Data

US 2021/0257743 A1 Aug. 19, 2021

Related U.S. Application Data

(60) Provisional application No. 62/978,095, filed on Feb. 18, 2020.

(51) Int. Cl.
*H01Q 15/14* (2006.01)

(52) U.S. Cl.
CPC .................................. *H01Q 15/141* (2013.01)

(58) Field of Classification Search
CPC .... H01Q 15/14; H01Q 15/141; H01Q 15/145; H01Q 15/148; H01Q 15/16; H01Q 15/161; H01Q 15/163; H01Q 15/168; H01Q 15/20; H01Q 19/10; H01Q 1/368
See application file for complete search history.

(56) References Cited

U.S. PATENT DOCUMENTS

| | | | | | |
|---|---|---|---|---|---|
| 6,195,067 | B1 * | 2/2001 | Gilger | H01Q 15/168 343/915 |
| 6,225,965 | B1 * | 5/2001 | Gilger | H01Q 15/168 343/915 |
| 8,044,866 | B2 | 10/2011 | Weaver | |
| 9,163,340 | B2 | 10/2015 | Vahhabaghai et al. | |

(Continued)

FOREIGN PATENT DOCUMENTS

| | | | | | |
|---|---|---|---|---|---|
| GB | 2330006 | A * | 4/1999 | H01Q 1/288 |
| GB | 2512083 | A * | 9/2014 | H01Q 1/04 |

(Continued)

OTHER PUBLICATIONS

Kang et al., "Transparent Patch Antenna Using Metal Mesh," IEEE Antennas and Propagation Society, 1-6 (2018).

(Continued)

*Primary Examiner* — Dameon E Levi
*Assistant Examiner* — Leah Rosenberg
(74) *Attorney, Agent, or Firm* — Bond, Schoeneck & King, PLLC; Joseph M. Noto

(57) ABSTRACT

An electromagnetic reflector composed of a non-knitted, non-metallic carbon-based material mesh, antenna system incorporating the reflector and method for fabrication are disclosed.

12 Claims, 9 Drawing Sheets

(56) References Cited

U.S. PATENT DOCUMENTS

| | | | | |
|---|---|---|---|---|
| 9,318,812 | B2 | 4/2016 | McCarville et al. | |
| 10,523,269 | B1 | 12/2019 | Henry et al. | |
| 10,681,447 | B2 | 6/2020 | Bibl et al. | |
| 11,027,500 | B1 * | 6/2021 | Bronisz | B29C 66/21 |
| 11,063,356 | B2 * | 7/2021 | Arya | H01Q 3/46 |
| 2006/0270301 | A1 * | 11/2006 | Marks | H01Q 15/142 442/304 |
| 2008/0251062 | A1 | 10/2008 | Dodo | |
| 2011/0180661 | A1 * | 7/2011 | Weaver | H01Q 3/44 244/1 R |
| 2016/0000374 | A1 | 1/2016 | Dandekar et al. | |
| 2016/0276750 | A1 * | 9/2016 | Glick | H01Q 15/16 |
| 2017/0191308 | A1 * | 7/2017 | Haq | H01Q 15/0013 |
| 2017/0201031 | A1 * | 7/2017 | Gelb | H01Q 13/0283 |
| 2018/0040962 | A1 * | 2/2018 | Lee | H01Q 15/147 |
| 2018/0173345 | A1 | 6/2018 | Pfeiffer | |
| 2021/0293521 | A1 * | 9/2021 | Stowell | B60C 5/14 |
| 2023/0115989 | A1 * | 4/2023 | Peterson | H01Q 15/14 343/915 |

FOREIGN PATENT DOCUMENTS

| | | | |
|---|---|---|---|
| KR | 20090013890 | 2/2009 | |
| KR | 20180058338 | 6/2018 | |
| WO | WO-2016087721 A1 * | 6/2016 | H01Q 1/288 |
| WO | WO-2021199921 A1 * | 10/2021 | |

OTHER PUBLICATIONS

Sedhed, "Electromagnetic Analysis of Reflector Antenna Surfaces," Master's Thesis Lund University, 1-81 2015.

International Report on Patentability for International Application PCT/US2021/018616 (mailed Jun. 23, 2021).

* cited by examiner

LASER CUT CARBON-BASED REFLECTOR AND ANTENNA SYSTEM

CROSS REFERENCE

This application claims the benefit of the filing date of U.S. Provisional Patent Application No. 62/978,095, filed Feb. 18, 2020, which is hereby incorporated by reference in its entirety.

This invention was made with government support under grant number 19-C-0016 awarded by National Reconnaissance Office, U.S. Government. The government has certain rights in this invention.

FIELD

The present disclosure relates to an electromagnetic reflector composed of a non-knitted, non-metallic carbon-based material mesh, antenna system incorporating the reflector and method for fabrication.

BACKGROUND

Over the last years, there has been an important effort to incorporate carbon nanotube (CNT)-based materials for space applications. These materials offer advantages over traditional materials such as weight savings and improvements in the extreme thermal performance requirements, which are often found in space applications. Although some structures have been successfully adapted for space applications, such as lightweight vibration dampers and data cables, others, with more stringent requirements or more challenging fabrication processes, have been more difficult to adapt.

For example, CNT-based high-precision RF mesh reflectors fabricated in accordance with the present procedures would present important advantages over state-of-the-art Au/Mo wire mesh. In addition, improvements in reduced reflectivity are expected due to the high reflectivity of Au/Mo wires. Unfortunately, it has been difficult to fabricate these structures using established methods. The present disclosure allows for the fabrication of precision structures via a high-precision laser cutting method.

Current methods for fabricating Au/Mo wire mesh reflectors include a knitted method, which results in meshes with irregular openings and shapes. Au/Mo wire mesh reflectors are preferred over solid reflectors due to their weight advantage and other advantageous attributes. The size of the openings of the Au/Mo wire mesh reflectors is often determined by the type of knitted stich but also by the tension at which the final product is held in a frame. As such, it is difficult to predict the electromagnetic reflection performance and the articles must be tested before their performance can be determined. These articles are generally classified as having a certain number of openings per inch (OPI), based on their performance at reflecting RF electromagnetic signals at certain frequency bands as illustrated in TABLE 1.

TABLE 1

| | | Frequency (GHz) | | Wavelength (lambda) | | |
|---|---|---|---|---|---|---|
| | | | | | | Opening size |
| OPI | Band | Lo | Hi | Lo (mm) | Hi (mm) | (mm) |
| 10 | x-band | 8 | 12 | 37.5 | 25.0 | 2.5 |
| 18 | x- to ku-band | 12 | 18 | 25.0 | 16.7 | 1.67 |
| 20 | ku- to ka-band | 18 | 26.5 | 16.7 | 11.3 | 1.13 |
| 40 | ka-band | 26.5 | 40 | 11.3 | 7.5 | 0.75 |
| 50 | >ka-band | 40 | | 7.49 | | 0.51 |

Often times the OPI classification does not reflect the actual number of openings per inch as this number is difficult to measure in a knitted structure due to its inherently irregular nature and variations in the way it is mounted on a frame or temperature induced changes. On the other hand, it has been shown that electromagnetic RF signals can be completely reflected by a conductive mesh as long as the size of the opening is smaller than $1/10^{th}$ of the wavelength of the signal. As such, one can accurately predict the RF behavior of a reflector and design the opening size to perform within the targeted frequency range.

Current state of the art fixed knitted mesh reflectors are composed of a backing structure frame constructed from an array of ribs and splines. The knit wire mesh reflective surface is spot-bonded to the structure, which sets the reflector surface figure. One disadvantage of this configuration is that the intimate connection between the mesh and backing structure makes it vulnerable to thermal distortions. Thus, the backing structure must hold tight tolerances on coefficient of thermal expansion (CTE). The state of the art antenna reflector accommodates for CTE mismatch between reflector surface and support structure by allowing the reflector surface to deform.

Recent attempts to use CNT-based materials for the fabrication of high-precision structures for space applications have often involved the adaptation of a traditional method of fabrication like knitting. Recent efforts have focused on creating an Au—Mo-equivalent CNT wire with the same properties. After much effort, current state of the art CNT wire still fails to provide the proposed technical goals. Although the knitting approach is based on the long-established process of knitting Au—Mo wire, it fails to allow for the use of a material like CNTs.

SUMMARY

In accordance with one aspect of the present invention, there is provided an electromagnetic reflector including a non-knitted, non-metallic substrate mesh of a carbon-based material having a uniform thickness and an array of openings, wherein the substrate has an electrical conductivity which reflects electromagnetic energy.

In accordance with another aspect of the present disclosure, there is provided a method for fabricating an electromagnetic reflector, including: placing a non-metallic, carbon-based substrate sheet having a uniform planar thickness into a laser cutter system; holding the sheet flat in the system with a vacuum; ablating portions of the substrate comprising a patterned array of a plurality of openings with a high-energy laser of the laser cutter system according to a subtractive technique fabricating a non-knitted, non-metallic, planar mesh reflector having an electrical conductivity which reflects electromagnetic energy; and removing the patterned mesh reflector from the laser cutter system.

In accordance with another aspect of the present disclosure, there is provided an electromagnetic antenna system including: a reflector having a non-knitted, non-metallic carbon-based substrate having a uniform thickness and an array of openings, wherein the substrate has an electrical conductivity which reflects electromagnetic energy; a transmitter/receiver, a reflector frame; a power source; and a processor.

These and other aspects of the present disclosure will become apparent upon a review of the following detailed description and the claims appended thereto.

DETAILED DESCRIPTION

Figure 1:
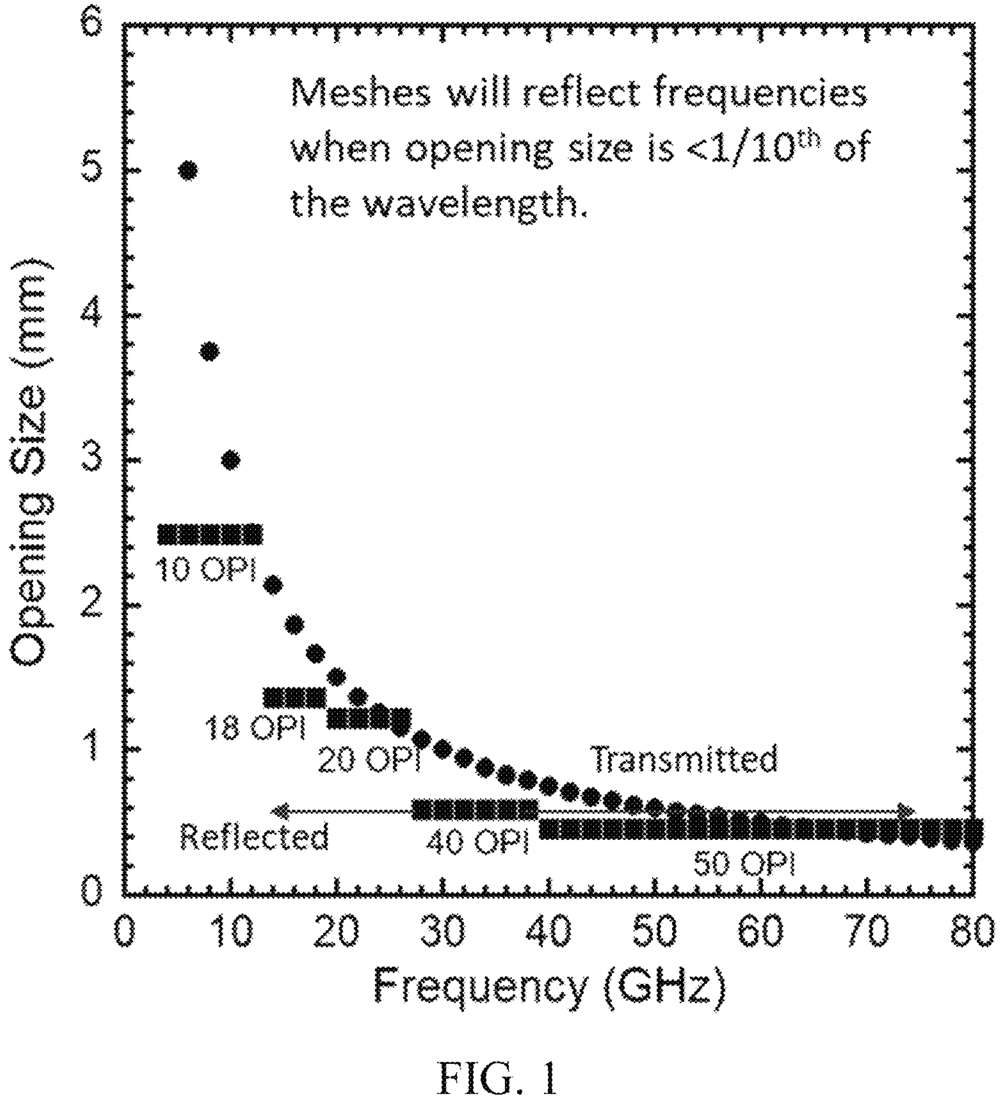
FIG. 1 is a graph of opening sizes vs ranges of frequencies reflected by meshes as illustrated by OPI ratings and opening size represented by dots corresponding to frequency.

This disclosure includes a fabrication technique of high-precision carbon-based structures that maintain the high quality and advantageous properties of advanced carbon-based materials, such as CNT materials, graphene and other derivate and/or composites. A laser cutting technique, which uses commercial or non-commercial $CO_2$, fiber, UV sources and/or any other suitable laser source, is disclosed which realizes the present structures. The laser cutting method has been optimized to deliver the precise cutting energy to accurately cut the CNT sheets without damaging their properties and to maintain the advantageous properties that CNT material present but are often unrealized when creating high-precision structures. The optimized cutting conditions are material dependent and based on not only their material properties, such as density or thermal conductivity, as examples, but also on the thickness as well as the material they are resting on during cutting, the temperature in the proximity of the cut region, the humidity, and other ambient conditions (gas, gas flow, etc.). Suitable carbon-based materials include single wall carbon nanotubes, multiwall carbon nanotubes, graphene-based, graphite, carbon fiber, carbon composite, and the like. This disclosure describes the fabrication of various carbon nanotube mesh reflectors using laser micromachining to cut the reflectors to a desired shape as well as to generate precision, highly regulated and spaced openings in the carbon nanotube sheets, with up to sub micrometer precision, and resolution, that is only limited by the laser cutter capabilities.

An electromagnetic reflector includes a non-knitted, non-metallic substrate mesh made from a carbon-based material having a uniform thickness and an array of openings. Conventional knitted mesh reflectors are currently being fabricated using a fine metallic wire as thread and performing a variety of knitting patterns such as single atlas, back half tricot, single satin mesh, two-bar tricot mesh, etc. In these knitted structures, the contact between wires is a sliding contact and not a metallurgical junction, which leads to non-idealities in the RF performance. Additionally, the wires do not all fall on the same plane resulting in a non-uniform thickness, the final surface reflects large amounts of light, and the final knitted mesh must be stretched with a certain tension to meet the required RF performance. A suitable reflector has a sufficient electrical conductivity (>0.1E6 S/m) which reflects electromagnetic energy by being able to create and sustain internal currents as a response of the impinging EM fields. A suitable uniform thickness includes a thickness that does not vary by more than 10% from a nominal thickness of the sheet.

The precision structures are composed of a starting material in the shape of a large sheet with the desired thickness, a suitable thickness of the sheet is in the range of 1 to 500 micrometers. Using a subtractive method, a high-energy laser is used to ablate the CNT material in the desired 2-D shape and form. The shape of the 2-D pattern could be of any geometrical dimension according to the application. A suitable reflector includes a parabolic-shaped reflector, which when integrated into an antenna system provides large gain by focusing or distributing the RF signal to the RF transmitter or receiver, a flat reflector to redirect RF signals and/or any other shape to help manipulate the path of RF signals.

The optical transmission of the mesh antenna can be controlled by adjusting the size of the features, with wider lines allowing less light to transmit through, and can be designed for ranges between 0% to >80% transmission. The conductivity parameters of the mesh substrate include tunable both uniform or non-uniform values between 1E3 S/m and 60E6 S/m. The electromagnetic, e.g., RF, reflectivity parameters of the antenna include tunable values with nearly 100% RF reflectivity up to a targeted frequency between 1 GHz to >1 THz, and/or 100% RF reflectivity for a tunable range of frequencies between 1 GHz to >1 THz.

Laser-cut CNT sheets provide a scalable way to create CNT devices with controllable and repeatable opening sizes. The disclosure demonstrates the ability to use CNT sheets as an alternative scalable substrate to conventional knitting technology that precisely controls openings to improve RF reflector design while reducing material (no gold) and manufacturing (laser cut vs knitting of gold-plated wire) costs. The ability to control size and shape of holes allows for use in a diverse set of applications (vs. 100% RF reflection) as it has been demonstrated that ~100% reflection in EM is obtained when the opening size of a conductive material is <$1/10^{th}$ of the wavelength of the impinging EM signal. For example, a 30 GHz signal has a wavelength of 10 mm, thus an opening size of <1 mm created in a sufficiently conductive material, will reflect ~100% of that signal. This technology will be particularly valuable as these antennae push to higher frequencies up to and beyond 50 GHz.

The present method enables greater control over prior techniques by accurately cutting openings, which can be designed to perform at a desired frequency. A knitted structure does not have this ability as the size of the openings is not uniform and the size changes as the mesh is stretched or moved. This is illustrated in FIG. 1 where the ranges of frequencies represented by rectangular ranges reflected by the knitted meshes are illustrated by their OPI ratings illustrating the fact that the size of the openings is variable and thus they provide non-uniform reflectivity for certain ranges. The dots in FIG. 1 illustrate the $1/10^{th}$ of the wavelength relationship to the EM signal frequency as discussed above, thus a 100% reflection up to a particular frequency (x-axis) can be targeted by making the opening size the number shown in the y-axis. For example, if one wants to reflect 100% of the signal below 30 GHZ, a mesh made of a conductive material with opening sizes of 1 mm or less should be made. An advantage of the present method is that the design can be focused on an opening size as illustrated by the specific data points along the curve which can reflect a particular targeted frequency as opposed to a range of frequencies. Thus, a desired frequency can be targeted by controlling the size of the mesh opening.

The mesh openings can be any shape (circular, oval, rectangular, square, triangular, polygonal, or the like) or size (from 1 micron to 10 mm), uniformly or non-uniformly spaced (from 1 micron to 10 mm) or distributed in any pattern (triangular, square, hexagonal, elongated triangular, or the like). Nearly 100% RF reflection can be achieved when the size of the opening is $<1/10^{th}$ of the wavelength of the impinging RF signal.

A system design for a fixed mesh reflector using a laser cut CNT mesh surface was developed. This concept includes a laser cut CNT mesh surface that is suspended within an outer structural ring called an edge spline via Z direction flexures connecting the edge spline to the outer edge of the surface. This system also includes X/Y direction flexures connecting the internal area of the CNT mesh surface to the backing structure. These interfaces collectively set the surface figure of the antenna. The advantage of this system is that is allows the CNT mesh and backing structure to move independently of each other mitigating the impact of thermal distortions due to a CTE mismatch between the surface and backing structure.

Figure 9:
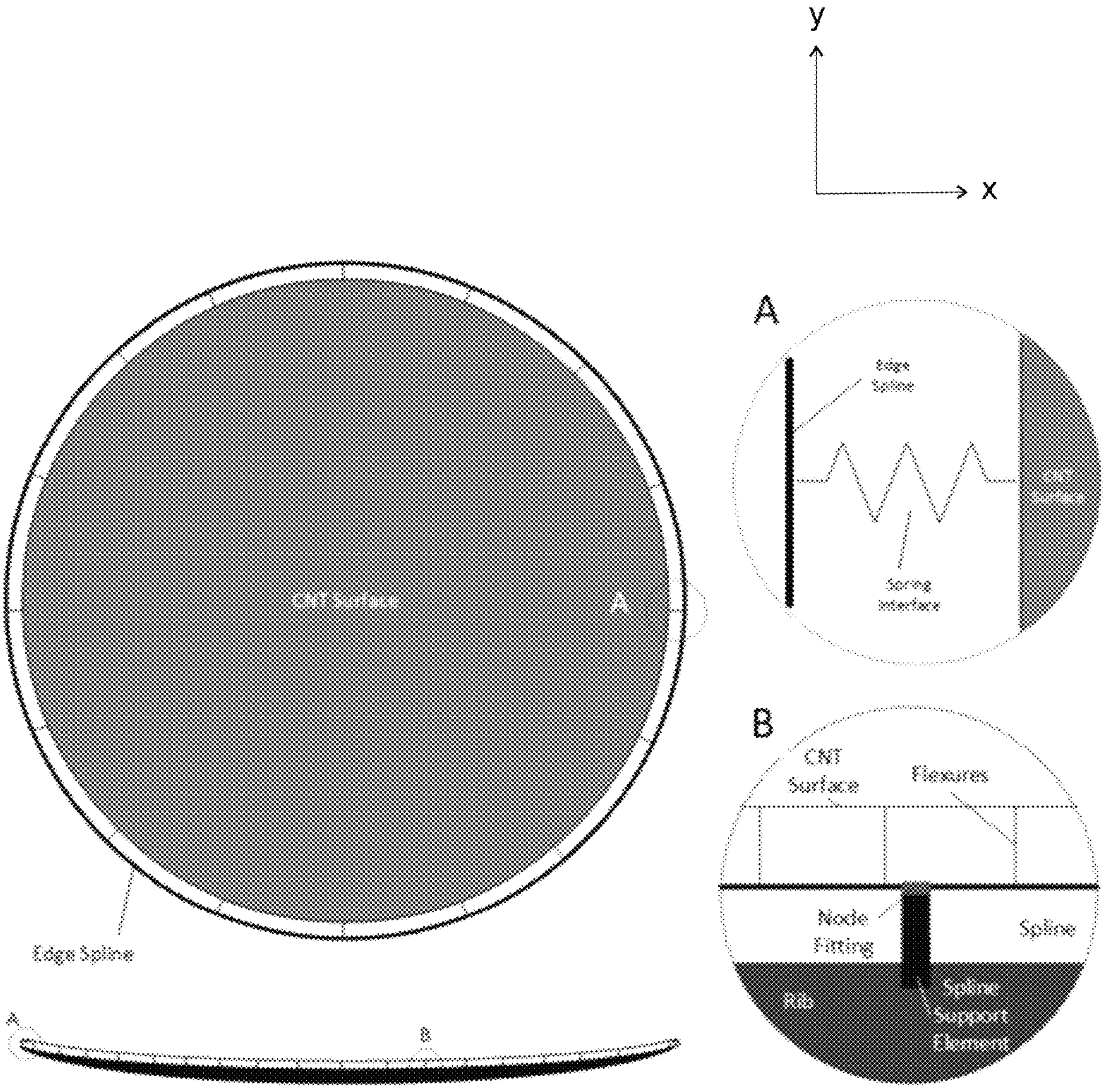
FIG. 9 illustrates a CNT surface interface with a backing structure of a fixed mesh reflector with insert A showing a top view and insert B showing a side view thereof.

FIG. 9 shows an embodiment of a CNT surface interface with a backing structure of a fixed mesh reflector to take advantage of the reflector unique properties. Insert A of FIG. 9 shows a top view and insert B of FIG. 9 shows a side view of a fixed mesh reflector with a CNT surface. The interfaces between the edge spline and the edge of the CNT surface are flexure structures that absorb displacement from the backing structure expanding/contracting with temperature.

Setting the surface figure of the reflector is achieved via a series of rod flexures between the splines and the surface. These flexures connect the splines to the CNT surface and at specific Z height that sets the surface into its concave shape. By allowing the surface to move in the X and Y orientations the backing structure and reflector surface are decoupled which prevents the transfer of thermal loads between the backing structure and the reflector surface. An advantage of a CNT surface in this configuration is that the transfer of load between the reflector surface and the backing structure is greatly reduced. A CTE mismatch between the CNT surface and the backing structure may be less impactful than in current state of the art fixed mesh reflector designs because the flexures reduce the load transfer between the backing structure and the reflector surface and avoiding deformation of the reflector surface.

In a preferred form, the laser cutter would be free to move large distances while maintaining the required precession and would be able to create very large structures up to 100's of meters in size. A possible solution would be a robotic arm with a laser source. The current form is limited to the size of the laser stage, which is usually up to 10 ft×10 ft. The CNT sheet materials are currently also limited to 8 ft×4 ft but can be ultrasonically bonded to create structures of theoretical infinite sizes.

The present approach will allow realizing precision structures with the advantages that CNT-based materials present. For some applications, mass savings would be the main objective while for others the benefits would include lower susceptibility to detection and improved thermal distortion performance. As an added benefit, the design flexibility that laser cutting offers could be explored with innovative designs.

Particular areas of benefit would be the design flexibility that would be afforded to the fabrication of traditional mesh and fixed-mesh RF reflectors. The present commercial approach is limited in utilizing CNT-based materials due to important challenges with traditional fabrication methods. The adaptation of a laser cutting method increases design flexibility and allow for the realization of precision structures, which take advantage of the physical and electrical properties provided by CNT materials.

The present laser fabrication method overcomes many of the challenges that current methods (knitting and others) present to realize an equivalent structure. In the case of knitting, the mesh dimensions are not defined by the wire diameter, but by the capabilities of the laser source and accuracy of the X-Y stage system. The stiffness and flexibility of the mesh material are defined by the chosen starting substrate and do not depend on weaving conditions. Different opening designs and feature densities could be easily implemented in the same structure and allow for further innovation for RF based antennas and receivers.

Lasers have been used as micromachining tools for a long time. Researchers have failed to realize the adaptation of this technique for the realization of large mesh structures with high-precision requirements. In addition, the realization of extending the size of the structures with movable robotic arms and bonded CNT sheets is not an obvious outcome as there are numerous technical challenges creating large area CNT sheets, and uniformly laser cutting them in large areas formats or even in pre-shaped forms.

The present approach uses lasers to create structures, which are typically fabricated by conventional knitting methods. The prior effort has been towards making a CNT yarn which has the same properties as conventional Au/Mo wires. The problem has been on creating CNT yarns with the appropriate diameter, stiffness, strength and tackiness so that they can be knitted with the traditional methods. The present approach circumvents this difficulty by fabricating the targeted structure directly on a substrate with the needed performance, by using a much simpler direct-write method.

Laser cutting with a 10.6 μm $CO_2$ laser has been used to realize structures such as antennas, van der Pauw structures for electrical characterization and "dogbone" structures for stress-strain measurements with CNT sheets. Test structures have been created to evaluate the best laser conditions to realize fine CNT structures. A Nanocomp CNT sheet was placed on a copper backplane, which is used to effectively sink the heat produced by the laser, and lines of different widths were produced while keeping the laser conditions the same.

CNT meshes have been designed, modeled, created and characterized using laser cutting to demonstrate the capabilities of the technology. The technology offers precise definition and great flexibility in terms of shapes and sizes. CNT lines with a width of 25 μm and openings of 9 μm are possible in large area arrays without degradation of strength or conductivity. The lines and openings can be from 1 micron to 10 mm in size. Indirect RF reflectivity measurements of a laser cut medium-OPI flat 12×12-inch CNT array of closed pack circles (700-μm diameter) has shown to outperform state-of-the art high OPI Au—Mo reflectors by reflecting higher frequency signals as a result of the precise control of the size of the openings provided by the laser cutting method.

The advantages if using CNT as reflector meshes in high OPI application include: (1) ultra-lightweight (areal density of 12 g/cm$^2$ vs. 39 g/cm$^2$), (2) structural thermal stability, due to lower coefficient of thermal expansion CTE (~−1 ppm/K vs. ~5.4 ppm/K), and (3) improved electrical stability, due lower temperature coefficient of resistance ($-2\times10^{-3}$ to $1\times10^{-4}$/K vs. ~$3.5\times10^{-3}$).

The laser cutting approach can be used to form parabolic dishes from laser cut meshes via relief cuts. These cuts follow contours determined by mapping the 3D parabolic dish onto a flat plane. Ultrasonic welding has been used to connect the different CNT sections. A 5" and 10" diameter demonstration was fabricated using a medium OPI mesh of close-packed circles. The 5" CNT dish (which is 6.2" in diameter when flat) has been affixed to a 6-armed, 3D printed scaffold. A 10" prototype has also been realized. The feasibility for future design and fabrication of unfurlable mesh reflectors constructed from laser-cut CNT meshes has been demonstrated in a 4" diameter conical CNT mesh is affixed to a miniature umbrella that can be furled and unfurled repeatedly.

Pre- and/or post-processing can be applied to laser-cut CNT material in order to improve the performance of the CNT article based on the requirements of the final application. The removal of iron catalyst impurities through HCl treatment has been demonstrated in laser-cut CNT mesh structures. Doping of CNT sheets with $KAuBr_4$ has shown to improve their electrical conductivity and their RF reflectivity. The application of polymer resins has been shown to enhance the tensile strength of laser-cut CNT structures. Other pre- and post-process methods are available and could be explored based on the final application and requirements.

The present laser fabrication method can rapidly accelerate construction of precision CNT structures for space applications. This technique has been used to design, fabricate, test, and characterize 1-meter reflect array antennas demonstrations, and to scale up to 3-meter prototypes. The laser cutting technology can be further applied to other CNT form factors and substrates in addition to CNT sheets.

The present disclosure is directed to a process for fabricating precision carbon nanotube-based structures using a laser cutting method, often referred to as laser micromachining. These carbon nanotube (CNT) structures can be cut into any desired shape from large flat sheets of commercially available CNTs using this method. The resulting 2D shapes are then subjected to further laser micromachining with CAD programs to generate precision, highly regulated and spaced openings. Any desired pattern or opening could be created, typical structures produced have either square or circular openings spaced at very precisely predetermined spacings. Advanced structures, such as those with other shaped openings or shape gradients can be produced as well. The resulting mesh structures are useful as RF reflectors or antennas and can be tailored to the appropriate wavelengths by varying the openings per square inch (OPI). RF antennas are typically parabolic in shape and can easily be produced with this technique by first forming circles of CNT mesh, followed by cutting relief slits in the material. Antennas have been produced with various OPIs in square, circular and other mesh shapes and evaluated for their reflectivity. The conductivity, strength and RF reflectivity of the CNT materials can be improved by chemically processing the CNT sheets. For conductivity enhancements dopants include potassium tetrabromoaurate or $KAuBr_4$. For strength/reflectivity enhancements the sheets can be treated with polymers or resins. Current materials used in conventional RF reflecting antennas are made from knit gold-molybdenum wires which have random shapes and openings and are limited in design flexibility. The present CNT antennas are typically 63% lighter than the conventional RF reflecting antennas made from Au/Mo materials, offering significant advantages for may applications, such as deployment in space.

In an embodiment, a method for fabricating an electromagnetic reflector, includes placing a non-metallic, carbon-based substrate sheet having a uniform planar thickness into a laser cutter system, which could be belt or optically driven and uses commercial or non-commercial $CO_2$, fiber, UV sources and/or any other suitable laser source; holding the sheet flat in the system with a vacuum to overcome thickness non-uniformities and ensure uniform focal length of the laser beam; ablating or thermally decomposing portions of the substrate providing a patterned array of a plurality of openings with a high-energy laser of the laser cutter system according to a subtractive technique where sections of material are selectively removed from an initial substrate to create the desired features, fabricating a non-knitted, non-metallic, planar mesh reflector having a sufficient electrical conductivity (>0.1E6 S/m) which reflects electromagnetic energy by being able to create and sustain internal currents as a response of the impinging EM fields; and removing the patterned mesh reflector from the laser cutter system.

In an embodiment, an electromagnetic antenna system includes a reflector made from a non-knitted, non-metallic carbon-based substrate mesh having a uniform thickness and an array of openings, wherein the substrate has an electrical conductivity which reflects electromagnetic energy; a transmitter/receiver horn antenna or other shapes of antennas; a reflector frame made of a carbon fiber composite or other materials; a power source which could be a battery pack, a solar array or other forms of power; and a processor and/or RF source which generates and/or process the RF signals.

The disclosure will be further illustrated with reference to the following specific examples. It is understood that these examples are given by way of illustration and are not meant to limit the disclosure or the claims to follow.

Example 1

A 10.6 μm $CO_2$ laser was used at RIT to realize 1×1-inch prototypical RF mesh reflector structures. A large CNT sheet from Nanocomp technologies, a Huntsman company, composed of multi-walled CNTs and with a thickness of 25-30 μm was used as the starting substrate. A CAD layout with the required 2-D pattern was created and uploaded to the laser's X-Y control. The pattern consists of a pre-determined density of periodical openings in the shape of a square known as openings per square inch (OPI). The OPI of the mesh structures defines the targeted frequency of operation. For example, Low OPI is suitable for frequencies below the X-Band Medium OPI is suitable for frequencies between the X-Band and the Ku-Band, and High OPI is suitable for frequencies higher than the Ka-Band. The separation between the openings is identified as a "line" and can vary as a function of the required properties of the structure (weight, conductivity). Low-OPI structures were fabricated with 100 μm and 300 μm lines, medium-OPI structures were fabricated with 300 μm lines and high-OPI structures were fabricated with 100 μm lines.

Example 2

Figure 2:
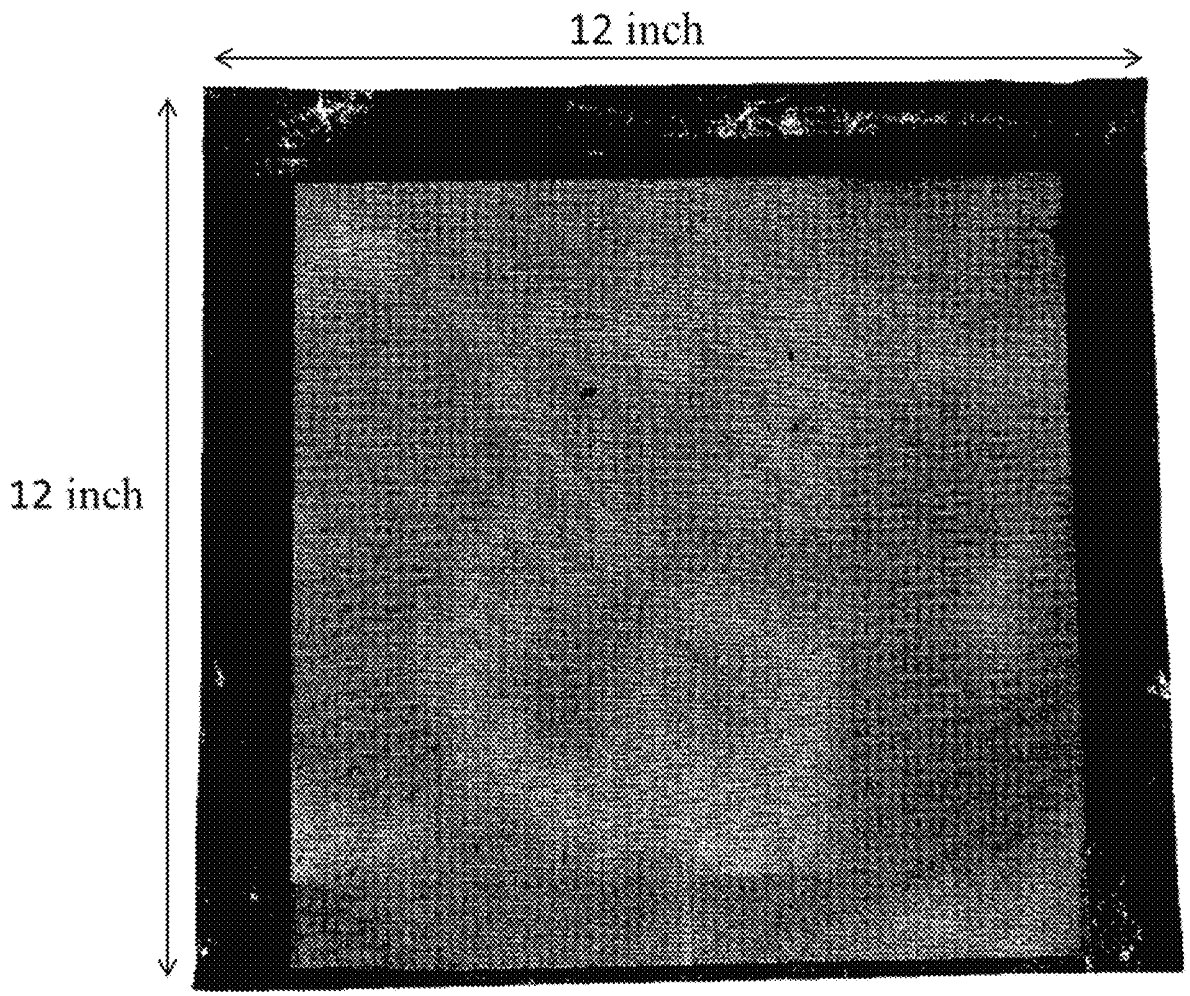
FIG. 2 is a picture showing a CNT sheet patterned with 700-micron diameter circles.
Figure 3:
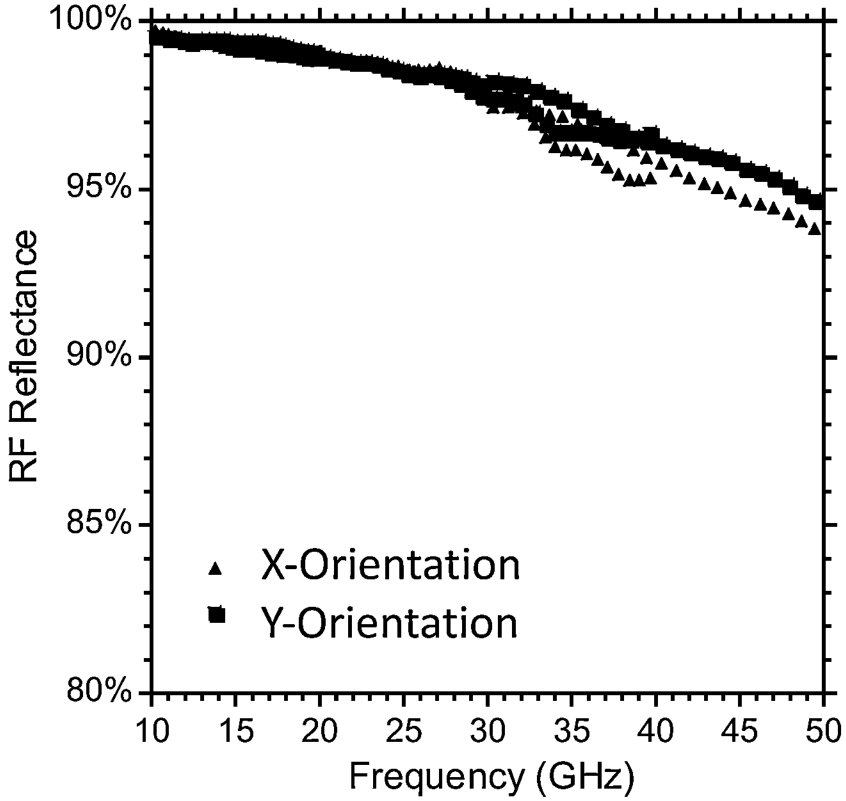
FIG. 3 is a graph showing RF reflectivity and transmissivity from reflectors prepared in accordance with the present method compared to those of a traditionally fabricated, state-of-the-art (SOA)Au—Mo mesh with similarly sized OPI structures.
Figure 4:
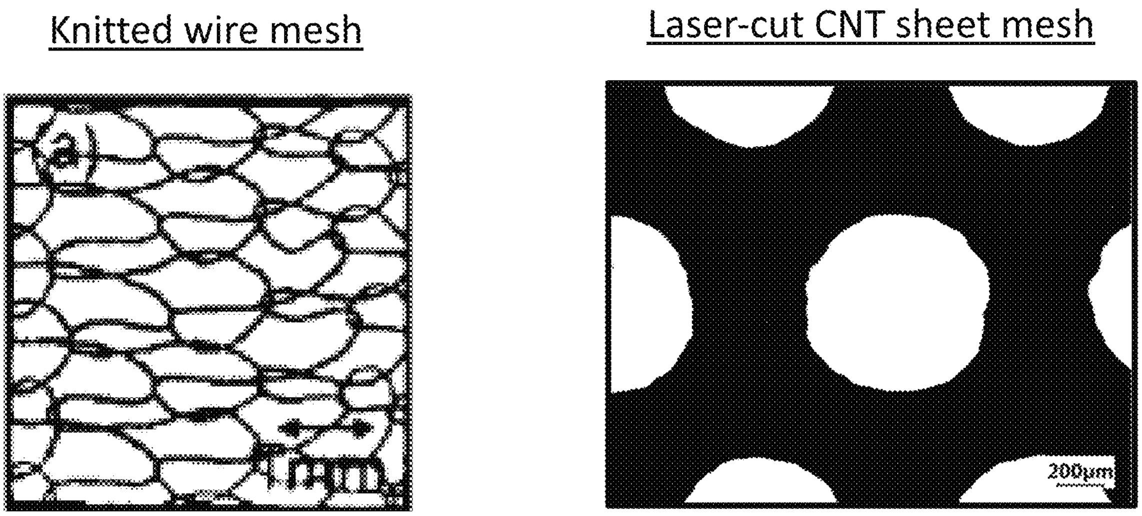
FIG. 4 shows a side-by-side comparison of openings of CNT mesh versus openings of knitted SOA mesh.

A 12×12-inch CNT sheet was patterned with 700-micron diameter circles in a close pack distribution and is shown in FIG. 2. The RF reflectivity and transmissivity were measured in both orthogonal orientations (X and Y orientations). The results of the test are shown in FIG. 3 illustrating the advantages of the present method. Whereas the SOA mesh reflects RF signals differently based on the X or Y orientation of the mesh, the laser cut CNT mesh reflects the signals equally independently of its orientation. This is due to the precise circular design of the openings of the CNT mesh versus the irregular openings of the knitted SOA meshes, which are illustrated in FIG. 4 as a side by side comparison. The precision of the laser-cut CNT sheet structures provides a clear advantage and performance benefit of the present method over the prior art methods.

The RF reflectivity and transmissivity were measured at the applicable frequencies (10-50 GHZ) and the RF performance matched those of a traditionally fabricated Au—Mo mesh with high opening density as shown in FIG. 3, where the amount of reflected signal at different frequencies was experimentally measured and calculated based on the signal transmitted, in the flat reflector and shows that over 95% of the RF signal is reflected up to 50 GHz.

Such demonstration structures illustrate the potential of this approach to align with the traditional operating frequencies of interest. The approach can be scaled from the initial 1×1-inch coupons to larger applicable structures. The laser cutting method of composite CNTs, which may incorporate epoxies, polymers, and other materials to alter strength, flexibility, conductivity, weight, appearance, and/or other targeted material properties, may need different fabrication conditions and could result on other applications where RF reflectivity is not the main objective.

Example 3

Low, medium and high OPI structures with Nanocomp's acetone-densified MWCNT have been fabricated. The initial prototypes included 1×1-inch low-OPI structures with 100 μm and 200 μm lines, 1×1-inch and 3×2-inch medium-OPI structures with 200 μm lines and 1×1-inch and 4×3-inch high-OPI structures with 200 μm lines.

Example 4

Figure 5:
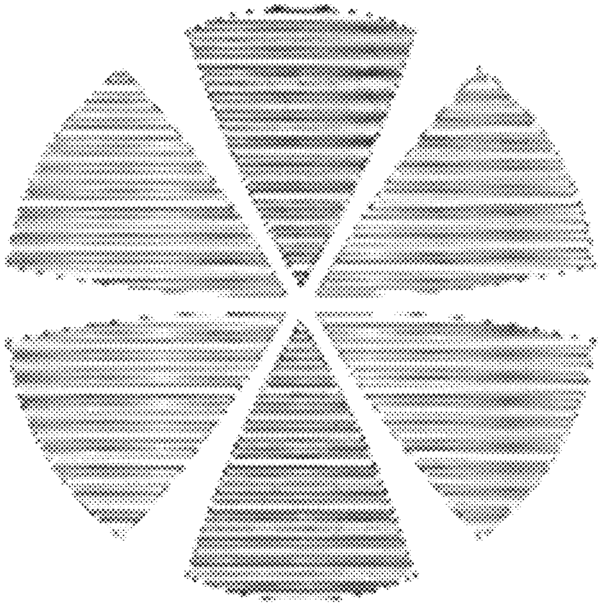
FIG. 5 shows a parabolic dish fabricated from laser cut meshes via relief cuts.
Figure 6:
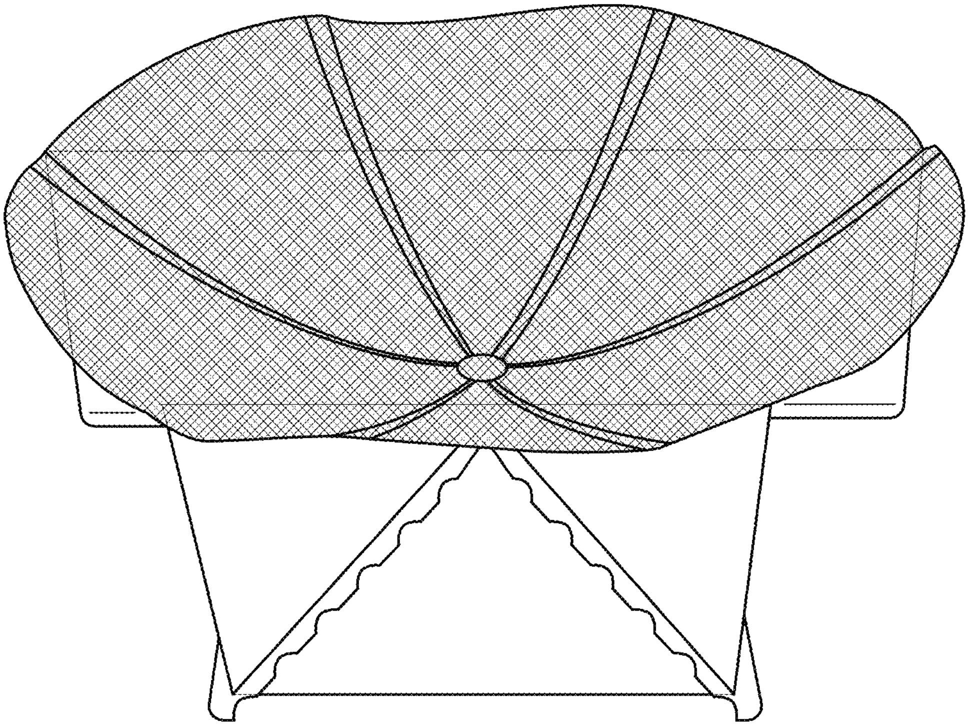
FIG. 6 shows a CNT dish affixed to a 6-armed, 3D printed scaffold.
Figure 7:
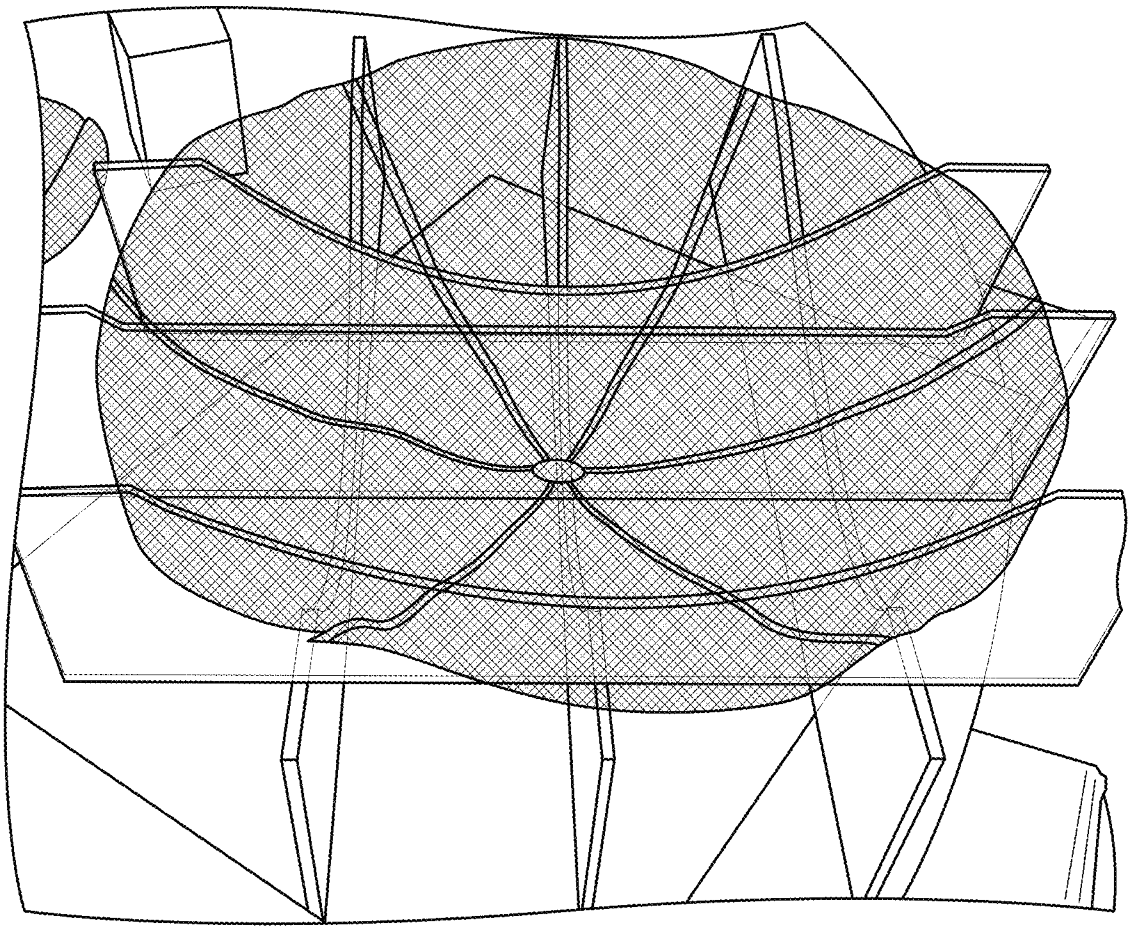
FIG. 7 shows a 10" prototype dish.
Figure 8:
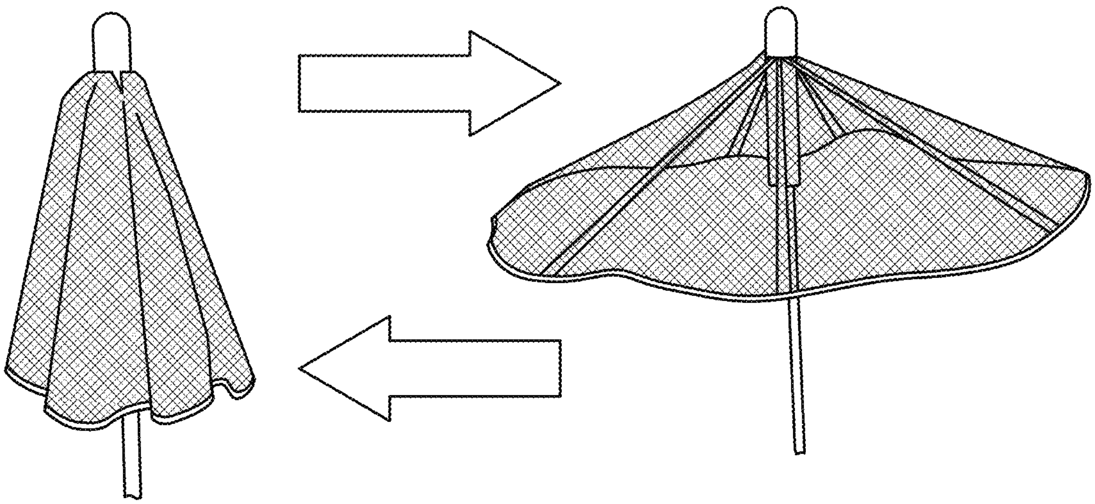
FIG. 8 shows laser-cut CNT meshes affixed to a miniature umbrella that can be furled and unfurled repeatedly.

Prototype parabolic dishes from laser cut meshes via relief cuts have also been fabricated as illustrated in FIG. 5. These cuts follow contours determined by mapping the 3D parabolic dish onto a flat plane. Ultrasonic welding has been used to connect the different CNT sections. A 5" and 10" diameter demonstration was fabricated using a medium OPI mesh of close-packed circles. The 5" CNT dish (which is 6.2" in diameter when flat) has been affixed to a 6-armed, 3D printed scaffold, as shown in FIG. 6. A 10" prototype has also been realized and is shown in FIG. 7. The feasibility for future design and fabrication of unfurlable mesh reflectors constructed from laser-cut CNT meshes has been demonstrated in a 4" diameter conical CNT mesh, shown in FIG. 8, is affixed to a miniature umbrella that can be furled and unfurled repeatedly.

Experimental procedures for laser cutting large area carbon nanotube sheets can be found in "Experimental design for $CO_2$ laser cutting of sub-millimeter features in very large-area carbon nanotube sheets," (Optics & Laser Technology, Volume 134, 2021, 106591, ISSN 0030-3992, https://doi.org/10.1016/j.optlastec.2020.106591) which is hereby incorporate herein by reference in its entirety.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. An electromagnetic reflector comprising:

a non-knitted, non-metallic single sheet mesh comprising carbon nanotube or graphene having a uniform thickness and an array of openings, wherein the sheet has an electrical conductivity which reflects greater than 95% electromagnetic energy up to 50 GHz, wherein the reflector is connected to an outer ring via Z direction flexures and to a backing structure via an array of X and Y direction flexures, allowing the mesh and the backing structure to move independently of each other.

2. The reflector of claim 1, which has a parabolic or flat shape.

3. The reflector of claim 1, wherein the openings have a circular shape.

4. The reflector of claim 1, wherein the thickness does not vary by more than 10% from a nominal thickness.

5. The reflector of claim 1, wherein the thickness is in the range of from 1 to 500 micrometers.

6. The reflector of claim 1, wherein the reflector has tunable conductivity parameters which include both uniform and non-uniform values between 1E3 S/m and 60E6 S/m.

7. A method for fabricating an electromagnetic reflector, comprising:

placing a non-metallic, carbon-based substrate sheet having a uniform planar thickness into a laser cutter system;

holding the sheet flat in the system with a vacuum;

ablating portions of the substrate comprising a patterned array of a plurality of openings with a high-energy laser of the laser cutter system according to a subtractive technique fabricating a non-knitted, non-metallic, planar mesh reflector having an electrical conductivity which reflects greater than 95% electromagnetic energy up to 50 GHz;

removing the patterned mesh reflector from the laser cutter system; and mounting the reflector to an outer ring via Z direction flexures and to a backing structure via an array of X and Y direction flexures, allowing the mesh and the backing structure to move independently of each other.

8. The method of claim 7, further comprising forming the patterned mesh reflector into a parabolic-shaped dish antenna reflector.

9. The method of claim 7, wherein the reflector has an optical transmission that can be varied based on the size of the array of openings.

10. The method of claim 7, further comprising at least one of pre-treating and post-treating the substrate sheet with polymers or dopants to alter material properties of the substrate.

11. The reflector of claim 1, wherein the openings comprise laser-cut openings.

12. The reflector of claim 1, wherein the single sheet mesh has a tunable optical transmission.

* * * * *